Oct. 12, 1943.   O. V. PUZIK   2,331,345
TREAD BLOCK CORE FOR ENDLESS TRACKS AND THE LIKE
Filed Feb. 27, 1942   3 Sheets-Sheet 1

INVENTOR:
OTTO V. PUZIK
BY
Hyde and Meyer
ATTORNEYS.

Oct. 12, 1943.  O. V. PUZIK  2,331,345
TREAD BLOCK CORE FOR ENDLESS TRACKS AND THE LIKE
Filed Feb. 27, 1942    3 Sheets-Sheet 2
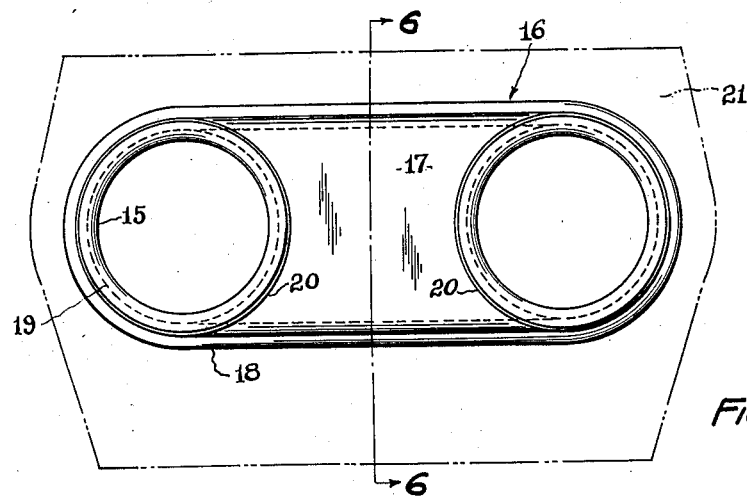
Fig. 4
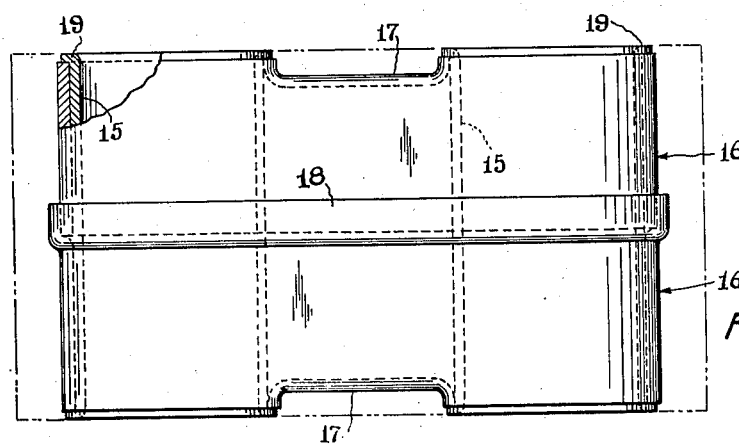
Fig. 5
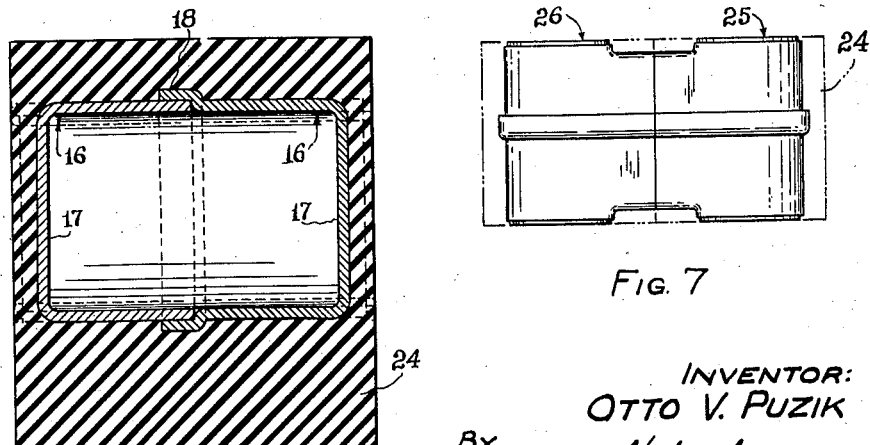
Fig. 6
Fig. 7
INVENTOR:
OTTO V. PUZIK
BY
ATTORNEYS.

Oct. 12, 1943.　　　　O. V. PUZIK　　　　2,331,345
TREAD BLOCK CORE FOR ENDLESS TRACKS AND THE LIKE
Filed Feb. 27, 1942　　　　3 Sheets-Sheet 3

INVENTOR:
OTTO V. PUZIK
BY Hyde and Meyer
ATTORNEYS.

Patented Oct. 12, 1943

2,331,345

UNITED STATES PATENT OFFICE 2,331,345

TREAD BLOCK CORE FOR ENDLESS TRACKS AND THE LIKE

Otto V. Puzik, Cleveland Heights, Ohio, assignor to Rudolph I. Schonitzer, Shaker Heights, Ohio Application February 27, 1942, Serial No. 432,558

11 Claims. (Cl. 305—10)

This invention relates to endless tracks for vehicles such as tanks, tractors and the like. More particularly, the present invention relates to improvements in the re-enforcing cores for the rubber tread blocks of such tracks.

The type of tread block core with which the present invention is concerned is one having a pair of metal tubes adjacent, and substantially parallel with, the front and rear ends of the core, for the extension therethrough of cross rods by means of which a set of tread blocks, containing cores of the character here involved, may be connected to form an endless track, the laterally projecting end portions of said cross rods being suitably connected in pairs, at each side of the track, by means not necessary to be here described.

The present invention has for its general object the provision of a tread block core in which the metal tubes thereof are mounted in a simple and inexpensive sheet metal support of great structural strength and rigidity, as a consequence of which said core is particularly well adapted for the effective reenforcement of the rubber which is bonded to opposite faces of said core to form a tread block.

A further object of the present invention is the provision of a tread block core which comprises a pair of tubular members and a sheet metal support therefor of box-like form in which said tubular members are mounted, said support being provided with re-enforcing parts so constructed and arranged as to materially increase the strength, rigidity and durability of said support and hence, of the core as a whole.

A further object of the present invention is the provision of a tread block core which comprises a pair of metal tubes and a support therefor in the form of a pair of sheet metal members of elongated cup-like character, the end portions of said tubes extending through apertures in the base portions of said cup-like members and being outwardly flanged to prevent relative movement of said cup-like members and endwise movement of said tubes relative thereto, with the consequent provision of a unitary core of unusual sturdiness.

A further object of the present invention is the provision of a tread block core in which the sheet metal support for the tubes thereof comprises a pair of laterally spaced cup-like members having apertures in their base portion for the reception of the ends of said tubes, and a plurality of intermediate members of similar form, said laterally spaced members and the members therebetween being rigidly clamped in side-by-side assembly, with their adjacent edge portions in telescopic relation, by the metal tubes which are mounted therein.

A further object of the present invention is the provision of a tread block core in which the support for the tubes thereof comprises a pair of sheet metal members arranged side-by-side and in telescopic relation, the ends of said tubes being mounted in apertures in those portions of said sheet metal members which constitute the side walls of the support.

Further objects of the present invention will appear from the following description of three tread block cores embodying said invention, said cores being illustrated in the accompanying drawings, in which Fig. 1 is a top plan view of a section of one form of endless track having rubber tread blocks provided with cores embodying the present invention, the means by which are connected the laterally projecting end portions of the cross rods which extend through said tread blocks to maintain them in endless track form being omitted, inasmuch as said connecting means is not here involved;

Fig. 4 is a side elevational view of one of the cores of the side tread blocks of the track of Fig. 1, and showing in dot-dash lines the outer periphery of the block of rubber in which said core is embedded to form a side tread block, the cores of the other side tread blocks of the track of Fig. 1 being identical with the core here shown;

Fig. 5 is a top plan view of the core of Fig. 4, and showing in dot-dash lines the outer periphery of the aforesaid block of rubber;

Fig. 6 is a cross-sectional view of a side tread block of the track of Fig. 1, containing the core of Fig. 4;

Figure 1:
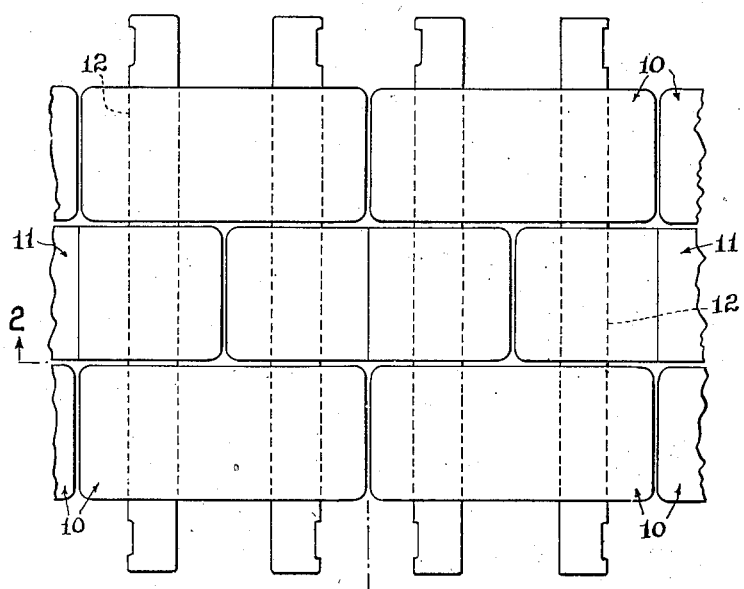
Figure 3:
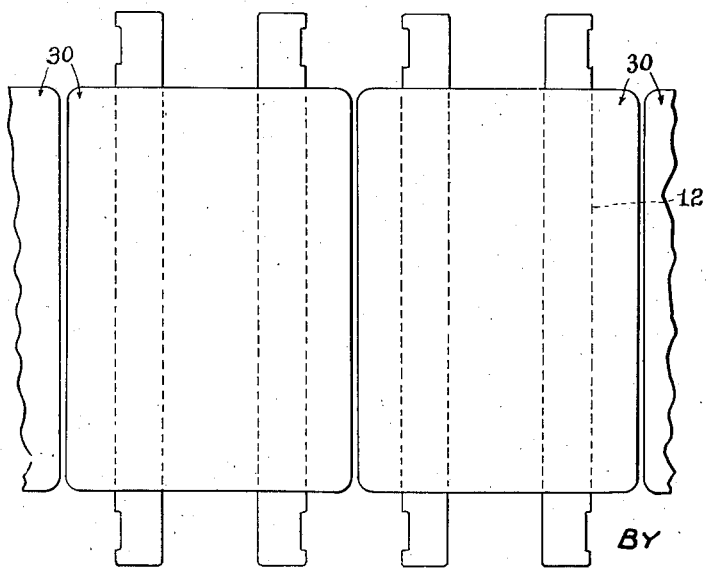
Fig. 3 is a top plan view of a section of another form of endless track having rubber tread blocks embodying the present invention, the means by which are connected the laterally projecting end portions of the cross rods which extend through said tread blocks to maintain them in endless track form being omitted, inasmuch as said connecting means is not here involved.
Figure 8:
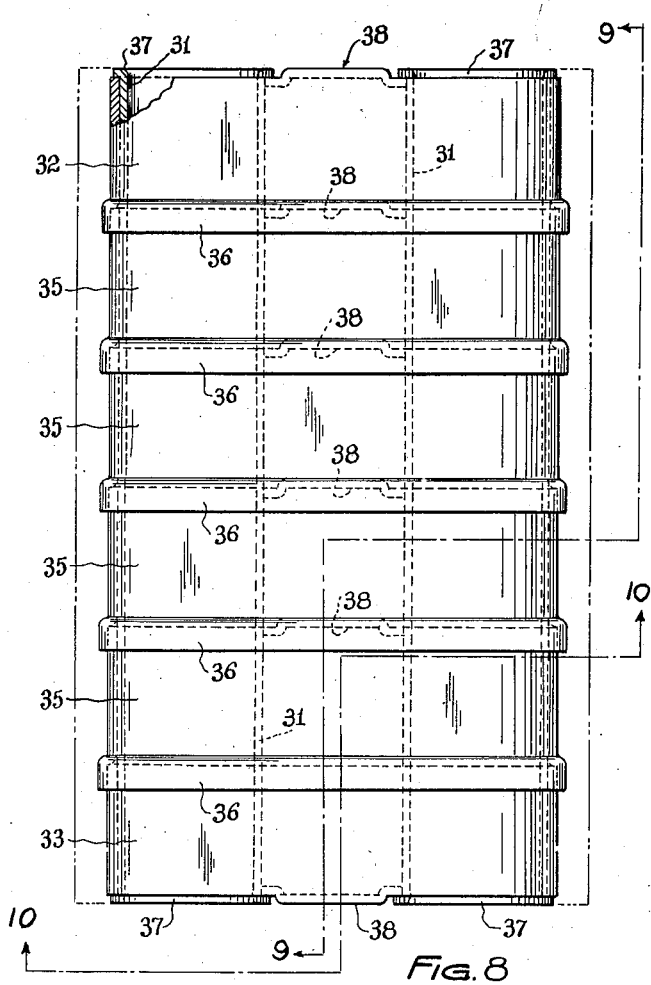
Figure 9:
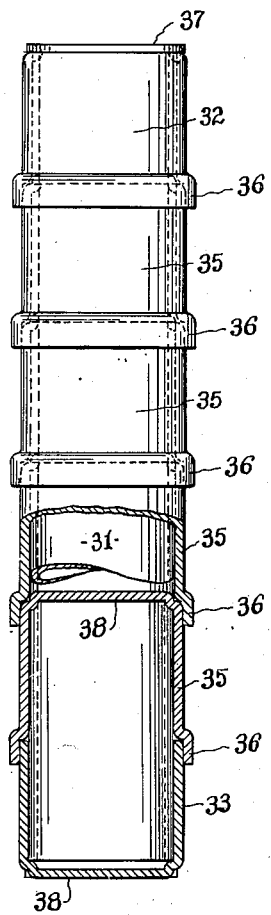
Figure 10:
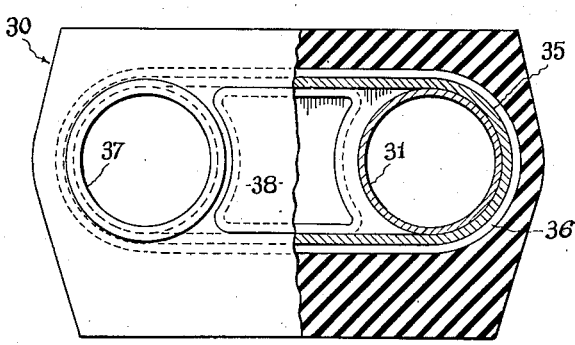

Fig. 7 is a top plan view, on a somewhat reduced scale, of one of the transversely split cores of the correspondingly split middle tread blocks of the track of Fig. 1, and showing in dot-dash lines the outer periphery of the two-sectional block of rubber in which said core is embedded to form a middle tread block, the cores of the other middle tread blocks of the track of Fig. 1 being identical with the core here shown;

Fig. 8 is a top plan view of a core of one of the tread blocks of the track of Fig. 3, and showing in dot-dash lines the projecting front and rear end portions of the block of rubber in which said core is embedded to form a tread block, the cores of the other tread blocks of the track of Fig. 3 being identical with the core here shown;

Fig. 9 is a view of the core of Fig. 8, partly in vertical section and partly in front elevation, on the line 9—9, Fig. 8; and Fig. 10 is a cross sectional view of one of the tread blocks of the track of Fig. 3, containing the core of Figs. 8 and 9.

Before the present invention is described in detail, it is to be understood that such invention is not limited to the details of construction or the specific arrangement of parts herein illustrated or described, as the invention obviously may take other forms. It also is to be understood that the phraseology or terminology herein employed is for the purpose of description and not of limitation, the scope of the present invention being denoted by the appended claims.

Figure 2:
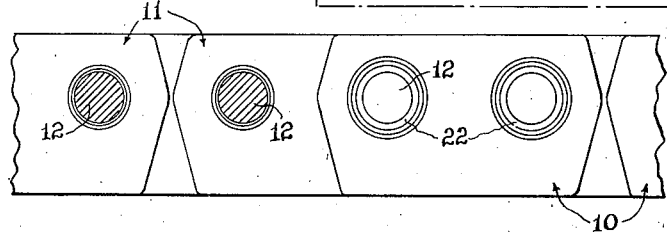
Fig. 2 is a view, partly in vertical section and partly in side elevation, of the track section of Fig. 1, the view being on the line 2—2, Fig. 1.

As indicated in Figs. 1 and 2, the tread blocks of an endless track may be of the type, as to size and shape, which are longitudinally disposed in parallel endless rows, with the tread blocks of the several rows connected by cross rods to form an endless track of the desired width; or, as shown in Fig. 3, the tread blocks of an endless track may be of the type, as to size and shape, which are transversely disposed in such track, with the length of each such tread block coincident with the track width. For the disclosure of the present invention, there is shown in Figs. 4 to 7 inclusive cores for the tread blocks of the track of Fig. 1, and in Figs. 8 to 10 inclusive, a core for the tread blocks of the track of Fig. 3.

Referring first to Figs. 1 and 2, there is shown in such views a section of an endless track which comprises three rows of generally rectanguler, longitudinally disposed rubber tread blocks each containing a core embodying the present invention, there being two laterally spaced rows of side tread blocks 10 and a row of middle tread blocks 11, the middle tread blocks being of transversely split form and being staggered with respect to the side tread blocks. The tread blocks of the three rows are maintained in substantially contiguous relationship and in endless track form by cross rods 12 suitably connected at their ends in pairs by means not here shown or described, inasmuch as said connecting means forms no part of the present invention. For the purposes of this application, it is sufficient to point out that each middle tread block 11 is connected to four side tread blocks 10 (two on each side thereof), and that each side tread block is connected to two middle tread blocks, inasmuch as each side tread block is overlapped by the rear section of one middle tread block and by the front section of the adjacent middle tread block, all as clearly shown in Fig. 1.

Inasmuch as the cores of the side tread blocks 10 of the track of Fig. 1 are of identical construction, a description of the core of one such tread block will suffice for all side block cores. Similarly, as the cores of the middle tread blocks 11 of the track of Fig. 1 are of identical construction, it will be necessary to describe the core of but one of those tread blocks, the only difference between the side tread block cores and the middle tread block cores being that the middle tread block cores are of transversely split form, as will hereinafter more fully appear.

From an examination of Figs. 4 to 6 inclusive, it will be evident that the core of each of the side tread blocks 10 comprises a pair of tubular members, such as the metal tubes 15, and a sheet metal support therefor of box-like form, the side walls of said support being suitably apertured to receive the ends of said tubes. As will be noted, the support for the tubes 15 comprises a pair of sheet metal members 16 of elongated cup-like form, said members being arranged side-by-side with their rim portions in telescopic relationship and with their base portions 17 provided with circular apertures (two in each such base portion) for the extension therethrough of the end portions of said tubes. The telescopic relationship of the cup-like members 16 produces, in effect, an interlocking thereof which enables them to be more easily held in rigid side-by-side assembly. For effecting the telescopic relationship of these cup-like members, the rim portion 18 of one of said members is outwardly offset so as to snugly receive the plain rim portion of the other of said members; and for effecting the rigid assembly of said members, in side-by-side relationship, the ends of the tubes 15 are bent outwardly, the annular tube end flanges 19 thus formed overlying the base portions 17 of said members and tightly clamping said members together, as clearly shown in Fig. 5.

In order to provide a more rigid and sturdier core, the cup-like members 16 preferably, and here are, of such size as to snugly receive the tubes 15, and inasmuch as said tubes are here located at the front and rear ends of said members, the curvature of the end portions of said members is such as to conform to the curvature of said tubes, as best shown in Fig. 4. For the formation of the tube-receiving apertures in the base portions 17 of members 16, the entire end areas of said base portions are removed, and in order to provide increased bearing surface for the inner or contiguous semi-circular sections of the end portions of said tubes, the end edge portions of the remaining metal of the base portions 17 of member 16 are laterally bent to form the semi-circular flange portions 20. These flange portions 20 are here readily formed by inwardly offsetting the metal therebetween, which results, of course, in giving the cup-like members 16 increased strength and rigidity, as will be readily understood.

From the foregoing description of the core of the side tread blocks 10, it will be evident that said core is particularly well adapted for the effective and durable re-enforcement of the block of rubber 21 in which said core is embedded to form a side tread block. Any suitable means may be utilized, of course, for the bonding of said rubber to said core, the outer surfaces of the sheet metal members 16 being copper plated for such purpose, if desired. The inward offsetting of the base portions 17 of members 16 naturally is of material benefit in the securement of said rubber to the core, as it enables the rubber to extend along the sides of the core between the arcuate base portion flanges 20, as clearly shown in Fig. 6. If desired, the diameter of the tubes 15 may be such as to more or less snugly receive the cross rods 12 or, as here shown (see Fig. 2), the diameter of said tubes may be somewhat larger than that of said cross rods in order that said tubes may be provided with rubber or other linings 22. The two cup-like members 16 which constitute the support for the tubes 15 are rigidly held or clamped in side-by-side assembly by the annular end flanges 19 of said tubes, and any tendency of either of said members to shift, or move forwardly or rearwardly relative to the other, is effectively resisted, due to the telescopic relationship of their rim portions.

Referring now to Fig. 7, wherein is illustrated the core of the middle tread blocks 11 of the track of Fig. 1, it will be noted that said core differs from the core heretofore described for the side tread blocks 10 of such track only in that said middle tread block core is of transversely split form. It also will be noted from Fig. 7 that the block of rubber 24, in which said core is embedded to form a middle tread block, is of correspondingly split form. As a result, each middle tread block comprises a front section 25 and a rear section 26, the two sections being duplicates and very firmly held in abutting relationship, when in an endless track, by the connection of the track cross rods 12 (one of which cross rods extends through each of said sections).

Inasmuch as the cross rods 12 fit tightly in the tubes 15 of the cores of the side tread blocks 10 (said tubes being frequently rubber lined, as here shown), it is quite advantageous to make the middle tread blocks 11 of transversely split form. This enables factory assembled replacement units to be used in the field if replacement of a side tread block or a middle tread block section becomes necessary or desirable. Each such replacement unit consists of a pair of cross rods 12 on which are mounted two side tread blocks and two middle tread block sections therebetween, said sections constituting, when in a track, the adjacent sections of two adjacent middle tread blocks, all as will be readily understood. Inasmuch as the two sections of each middle tread block 11 are firmly held in abutting relation by the means (not shown) by which the cross rods 12 are connected, any tendency of a middle tread block section to turn about its cross rod is effectively resisted, all as will be readily understood.

Referring now to Figs. 8 to 10 inclusive, wherein is illustrated the core of the transversely disposed tread blocks 30 of the track of Fig. 3, it will be noted that said core, like those heretofore described, consists of a pair of metal tubes 31 and a sheet metal support therefor of box-like form. It also will be noted that said support includes a pair of elongated cup-like members 32 and 33 whose base portions are suitably apertured for the extension therethrough of the end portions of the tubes 31. Inasmuch as this core is substantially of full track width, its sheet metal support includes, in addition to the cup-like members 32 and 33 which constitute the side (or end) members of the support, a plurality of intermediate sheet metal members 35. As here shown, there are four such intermediate members disposed between the cup-like members 32 and 33, said intermediate members also being of elongated cup-like form and having apertured base portions for the extension therethrough of the tubes 31. For manufacturing economy and simplicity of assembly, said intermediate members 35 may be, and here are, identical with the side (or end) member 32.

In order to enable the six cup-like members of this support to be telescopically associated in their side-by-side relationship, the rim portion 36 of each such member, with the exception of the side (or end) member 33, is of outwardly offset form. As a result, the several members of this support are snugly nested in what may be considered an interlocking relationship, as will be readily understood.

As in the cores illustrated in Figs. 4 to 7 inclusive and heretofore described, the metal tubes 31 are utilized to rigidly clamp in associated relationship the sheet metal members constituting their support. For such purpose, the ends of the tubes 31 are flanged outwardly, as at 37, into firm engagement with the side (or end) members 32 and 33, with the consequent provision of a rigid and unitary core. If desired, and as here shown, the base portions of the cup-like members of this support may be outwardly offset, as at 38, between their tube-receiving apertures, which not only results in a stronger and sturdier core but also enables the core to have substantially flush side walls.

From the foregoing description of the core of Figs. 8 to 10 inclusive, it will be evident that such core is well adapted for the effective and durable re-enforcement of the block of rubber 39 in which said core is embedded to form a tread block 30. As in the cores of Figs. 4 to 7 inclusive, the support of this core is made up of telescopically related sheet metal members, which are rigidly clamped in such relationship by the annular flanges 37 of the tubes which are mounted therein.

Other features and advantages of cores embodying the present invention will be readily apparent to those skilled in the art to which such invention relates.

I claim:

1. A core for the rubber tread block of an endless track of the type in which the tread blocks of such track have cross rods extending therethrough, said core comprising a pair of spaced tubular members for the reception of track cross rods, and a sheet metal support for said tubular members, said support being of box-like form and having at least two sections in side-by-side association and in telescopic relationship.

2. A core for the rubber tread block of an endless track of the type in which the tread blocks of such track have cross rods extending therethrough, said core comprising a pair of spaced tubular members for the reception of said track cross rods, and a sheet metal support for said tubular members, said support comprising a pair of cup-like members arranged side by side with their rim portions in telescopic relation and with their base portions apertured for the reception of the end portions of said tubular members.

3. A core for the rubber tread block of an endless track of the type in which the tread blocks of such track have cross rods extending therethrough, said core comprising a pair of spaced metal tubes for the reception of track cross rods, and a sheet metal support for said tubes, said support comprising a pair of cup-like members arranged side by side with the rim portion of one of said members outwardly offset to receive the rim portion of the other of said members.

4. A core for the rubber tread block of an endless track of the type in which the tread blocks of such track have cross rods extending therethrough, said core comprising a pair of spaced metal tubes for the reception of track cross rods, and a sheet metal support for said tubes, said support comprising a pair of cup-like members arranged side by side with their rim portions in contiguous relation and with their base portions apertured for the extension therethrough of the end portions of said tubes, and abutments on the ends of said tubes between which said cup-like members are confined.

5. A core for the rubber tread block of an endless track of the type in which the tread blocks of such track have cross rods extending therethrough, said core comprising a pair of spaced metal tubes for the reception of track cross rods, and a sheet metal support for said tubes, said support comprising a pair of cup-like members arranged side by side with their rim portions in contiguous relation and with their base portions apertured for the extension therethrough of the end portions of said tubes, and flanges on the ends of said tubes between which said cup-like members are confined and by which said members are rigidly clamped in contiguous relation.

6. A core for the rubber tread block of an endless track of the type in which the tread blocks of such track have cross rods extending therethrough, said core comprising a pair of spaced metal tubes for the reception of track cross rods, and a sheet metal support for said tubes, said support being of box-like form and comprising at least three members arranged side by side, the end members of said support being of cup-like form and the end portions of said tubes being mounted in the base portions of said cup-like members.

7. A core for the rubber tread block of an endless track of the type in which the tread blocks of such track have cross rods extending therethrough, said core comprising a pair of spaced metal tubes for the reception of track cross rods, and a sheet metal support for said tubes, said support being of box-like form and comprising at least three cup-like members arranged side by side, the base portions of the two end members constituting the side walls of the support and being apertured for the reception of the end portions of said tubes.

8. A core for the rubber tread block of an endless track of the type in which the tread blocks of such track have cross rods extending therethrough, said core comprising a pair of spaced metals tubes for the reception of track cross rods, and a sheet metal support for said tubes, said support being of box-like form and comprising at least three members arranged side by side and in telescopic relation, the end members of said support being of cup-like form and the ends of said tubes being mounted in the base portions of said cup-like members.

9. A core for the rubber tread block of an endless track of the type in which the tread blocks of such track have cross rods extending therethrough, said core comprising a pair of spaced metal tubes for the reception of track cross rods, and a sheet metal support for said tubes, said support being of box-like form and comprising at least three cup-like members arranged side by side and in telescopic relation, the base portions of the two end members constituting the side walls of the support and being apertured for the reception of the end portions of said tubes.

10. A core for the rubber tread block of an endless track of the type in which the tread blocks of such track have cross rods extending therethrough, said core comprising a pair of spaced metal tubes for the reception of track cross rods, and a sheet metal support for said tubes, said support being of box-like form and comprising at least three members arranged side by side, the end members of said support being of cup-like form and the end portions of said tubes being mounted in the base portions of said cup-like members and abutments on the ends of said tubes between which the members of said support are rigidly confined in side-by-side relationship.

11. A core for the rubber tread block of an endless track of the type in which the tread blocks of such track have cross rods extending therethrough, said core comprising a pair of spaced metal tubes for the reception of track cross rods, and a sheet metal support for said tubes, said support being of box-like form and comprising at least three cup-like members arranged side by side, the base portions of the two end members constituting the side walls of the support and being apertured for the reception of the end portions of said tubes and end flanges on said tubes between which the cup-like members of said support are rigidly confined in side-by-side assembly.

OTTO V. PUZIK.